US008671260B2

(12) United States Patent
Abe et al.

(10) Patent No.: US 8,671,260 B2
(45) Date of Patent: Mar. 11, 2014

(54) MEMORY SYSTEM

(75) Inventors: Masahiro Abe, Tokyo (JP); Kouhei Fujishige, Mie (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 12/886,019

(22) Filed: Sep. 20, 2010

(65) Prior Publication Data

US 2011/0238928 A1     Sep. 29, 2011

(30) Foreign Application Priority Data

Mar. 25, 2010  (JP) ................. 2010-069328

(51) Int. Cl.
 *G06F 12/00*      (2006.01)
(52) U.S. Cl.
 USPC ....... 711/167; 365/185.33; 711/103; 711/115
(58) Field of Classification Search
 USPC ............... 711/103, 115, 167; 365/185.33
 See application file for complete search history.

(56) References Cited

U.S. PATENT DOCUMENTS

| | | | | |
|---|---|---|---|---|
| 6,044,439 | A * | 3/2000 | Ballard et al. | 711/137 |
| 6,587,956 | B1 | 7/2003 | Hiratsuka et al. | |
| 6,654,303 | B2 * | 11/2003 | Miyamoto et al. | 365/222 |
| 7,203,855 | B2 * | 4/2007 | Chou | 713/320 |
| 7,318,118 | B2 * | 1/2008 | Chu et al. | 711/103 |
| 7,325,104 | B2 * | 1/2008 | Satori et al. | 711/150 |
| 2008/0109627 | A1 * | 5/2008 | Toyama et al. | 711/167 |
| 2009/0157960 | A1 * | 6/2009 | Koga | 711/115 |
| 2009/0193184 | A1 * | 7/2009 | Yu et al. | 711/103 |

FOREIGN PATENT DOCUMENTS

| | | |
|---|---|---|
| JP | 11-203421 | 7/1999 |
| JP | 2002-149479 A | 5/2002 |
| JP | 2003-036205 | 2/2003 |
| JP | 2004-234713 | 8/2004 |
| JP | 2006-195569 | 7/2006 |
| JP | 2008-033379 | 2/2008 |
| JP | 2008-33379 | 2/2008 |
| JP | 2009-251888 | 10/2009 |
| WO | WO2006/051779 A1 | 5/2006 |

OTHER PUBLICATIONS

Office Action issued Jul. 17, 2012 in Japanese Patent Application No. 2010-069328 with English language translation.
Japanese Office Action Issued Apr. 3, 2012 in Patent Application No. 2010-069328 (with English translation).

* cited by examiner

*Primary Examiner* — Hashem Farrokh
(74) *Attorney, Agent, or Firm* — Oblon, Spivak, McClelland, Maier & Neustadt, L.L.P.

(57) ABSTRACT

According to one embodiment, a memory system includes a memory that includes a plurality of parallel operation elements, each of which stores therein write data from a host device and on each of which read/write is individually performed, a control unit that performs the read/write to the parallel operation elements simultaneously, and a required-performance measuring unit that measures a required performance from the host device are included. The control unit changes the number of simultaneous executions of the read/write of the parallel operation elements based on the required performance measured by the required-performance measuring unit.

21 Claims, 8 Drawing Sheets

HEAVY USER MODE

LIGHT USER MODE

MEMORY SYSTEM

CROSS-REFERENCE TO RELATED APPLICATIONS

This application is based upon and claims the benefit of priority from the prior Japanese Patent Application No. 2010-069328, filed on Mar. 25, 2010; the entire contents of which are incorporated herein by reference.

FIELD

Embodiments described herein relate generally to a memory system.

BACKGROUND

As a memory system used in a computer system (hereinafter, computer), an SSD (Solid State Drive) on which a nonvolatile semiconductor memory such as a NAND-type flash memory (hereinafter, simply, NAND memory) is mounted attracts attention. The memory system such as the SSD has advantages such as high speed and lightweight compared with a magnetic disk device.

Typically, a required performance of the computer to the memory system in read/write processing is different largely depending on specifications of the computer itself, a user, and a usage environment of the user. On the other hand, the speed in the read/write processing is fixedly set on the memory system side in most cases. Therefore, for a user who does not need a maximum value of the read/write processing in the specifications of the memory system, the specifications of the memory system exceed the requirements, so that the computer is not always optimally configured in power consumption or the like.

On the other hand, for example, Japanese Patent Application Laid-open No. 2009-251888 discloses a technology for the memory system that operates with a desired current consumption by changing the speed of the read/write processing based on a command from the computer. With this technology, the computer needs to have specifications to issue the command.

DETAILED DESCRIPTION

In general, according to one embodiment, a memory system includes a memory that includes a plurality of parallel operation elements, each of which stores therein write data from a host device and on each of which read/write is individually performed, a control unit that performs the read/write to the parallel operation elements simultaneously, and a required-performance measuring unit that measures a required performance from the host device are included. The control unit changes the number of simultaneous executions of the read/write of the parallel operation elements based on the required performance measured by the required-performance measuring unit.

Exemplary embodiments of a memory system will be explained below in detail with reference to the accompanying drawings. The present invention is not limited to the following embodiments.

Figure 1:
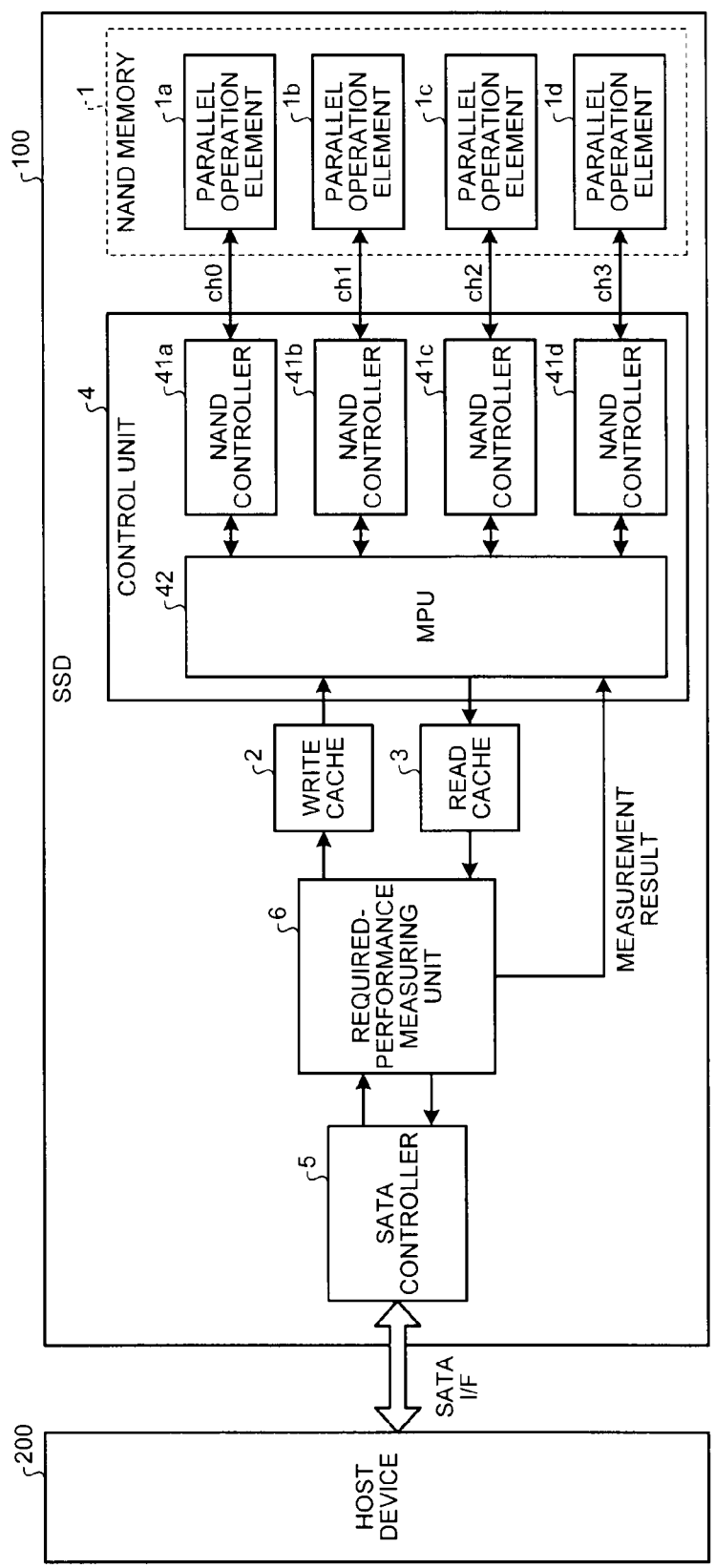
FIG. 1 is a block diagram illustrating a configuration of an SSD in a first embodiment.

FIG. 1 is a block diagram illustrating a configuration of a memory system according to a first embodiment of the present invention. In this example, an SSD is applied as an example of the memory system; however, the present embodiment can be applied to devices other than the SSD.

As shown in FIG. 1, an SSD 100 is connected to a host device 200 such as a personal computer and a cell phone with a communication interface (SATA I/F) of a SATA (Serial Advanced Technology Attachment) standard to function as an external storage device of the host device 200. However, a communication interface may be selected from a SAS (Serial Attached SCSI) interface or a PCI (Peripheral Component Interconnect) Express interface.

The SSD 100 includes a NAND memory 1 as a nonvolatile memory that stores therein data (write data from the host device 200) that is read/written from the host device 200, a write cache 2, a read cache 3, a control unit 4 that controls a data transfer between the write cache 2 and the read cache 3 and the NAND memory 1, and a SATA interface controller (SATA controller) 5 that controls a data transfer between the host device 200 and the write cache 2 and the read cache 3.

The write cache 2 caches data written from the host device 200. The read cache 3 caches data read from the NAND memory 1. The write cache 2 and the read cache 3 are, for example, composed by a DRAM (Dynamic Random Access Memory), an SRAM (Static Random Access Memory), or an FeRAM (Ferroelectric Random Access Memory).

In the case where a write request is issued from the host device 200, data sent from the host device 200 is once written in the write cache 2 by the SATA controller 5. The data written in the write cache 2 is written in the NAND memory 1 by the control unit 4 at a predetermined timing. In the case where a read request is issued from the host device 200, when read-requested data is cached in the read cache 3, this data is read out from the read cache 3 by the SATA controller 5 and is transmitted to the host device 200. When the read-requested data is not cached in the read cache 3, the read-requested data is read out from the NAND memory 1 by the control unit 4 and is once stored in the read cache 3. Then, the read-requested data stored in the read cache 3 is read out by the SATA controller 5 and is transmitted to the host device 200.

The NAND memory 1 includes a plurality of (in this example, four) parallel operation elements 1a to 1d that operate in parallel. The control unit 4 includes an MPU 42 and NAND controllers 41a to 41d. The NAND controllers 41a to 41d are connected to the parallel operation elements 1a to 1d via individual signal line groups (channel ch0 to ch3), respectively, and perform reading/writing individually to the parallel operation elements 1a to 1d, respectively, based on read command/write command from the MPU 42.

For example, in the case of writing data written in the write cache 2 in the parallel operation element 1a, the MPU 42 issues the write command in which an address (read address) of the write cache 2 in which the data is written and an address (write address) of a write destination of the parallel operation element 1*a* are specified to the NAND controller 41*a*. Upon receiving the write command, the NAND controller 41*a* reads out the data from the read address of the write cache 2 described in the received write command and writes the read data in the write address of the parallel operation element 1*a*.

Moreover, in the case of writing data written in the parallel operation element 1*a* in the read cache 3, the MPU 42 issues the read command in which an address of the parallel operation element 1*a* in which the data is written is set as the read address and an address of a write destination of the read cache 3 is set as the write address to the NAND controller 41*a*. Upon receiving the read command, the NAND controller 41*a* reads out the data from the read address of the parallel operation element 1*a* described in the received read command and writes the read data in the write address of the read cache 3.

In the similar manner to the case of performing reading/writing on the parallel operation element 1*a*, when performing reading/writing on the parallel operation elements 1*b* to 1*d*, the MPU 42 issues the read command/write command to the NAND controllers 41*b* to 41*d* individually. The MPU 42 causes the parallel operation elements 1*a* to 1*d* to perform a parallel operation by controlling the timing to transmit the write command/read command to each of the NAND controllers 41*a* to 41*d*.

As the number of the parallel operations of the parallel operation elements 1*a* to 1*d* becomes large, the speed of the read/write processing when viewed from the host device 200 improves; however, the power consumption (current consumption) of the SSD 100 increases. As described above, a required performance of the read/write processing to the SSD 100 is different depending on the specifications of the host device 200, a user, and a usage environment of the user. For example, when the host device 200 is used as a server, it is considered that large amount of data is read/written from/to the SSD 100 in a short time. In this case, the SSD 100 is required to perform the read/write processing at high speed. When the host device 200 is a computer represented by a netbook whose use frequency is lower than the server and which is required to have high portability, low power consumption is required rather than the high-speed read/write processing. Thus, in the first embodiment of the present invention, the SSD 100 measures the required performance from the host device 200 and adaptively changes the number of the parallel operations in accordance with the measurement result of the required performance.

As the configuration to achieve the above, the SSD 100 includes a required-performance measuring unit 6 that measures the required performance of the host device 200 with respect to the SSD 100. The required-performance measuring unit 6 is provided to intervene between the SATA controller 5 and the write cache 2 and the read cache 3, and measures a write amount to the write cache 2 and a read amount from the read cache 3 per unit time as the required performance to the SSD 100. The unit time is one day as an example. The measured write amount and read amount (measurement result) per unit time is sent to the MPU 42. The MPU 42 changes the number of the parallel operations at the time of writing and the number of the parallel operations at the time of reading in accordance with the write amount and the read amount per unit time received from the required-performance measuring unit 6, respectively. The number of the parallel operations can take any value between the minimum value (one in this example) and the maximum value (four in this example). In this example, the number of the parallel operations is set to two and four, and a mode that operates with the number of the parallel operations set to two is defined as a light user mode and a mode that operates with the number of the parallel operations set to four is defined as a heavy user mode.

Figure 2A:
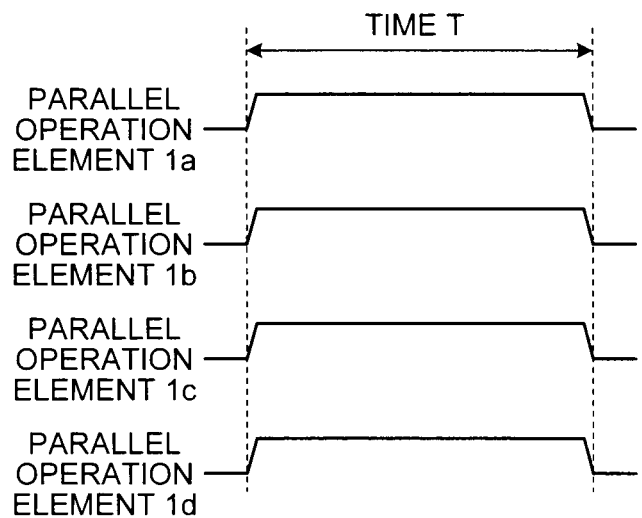
FIGS. 2A and 2B are timing charts explaining an operation timing in respective modes.
Figure 2B:
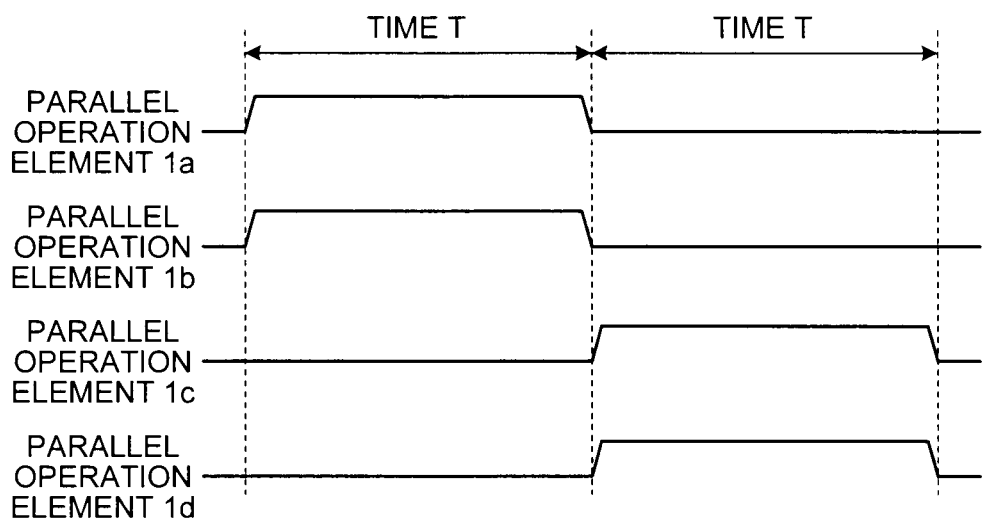

FIGS. 2A and 2B are timing charts explaining an operation timing in respective modes. FIG. 2A illustrates a write operation in the heavy user mode and FIG. 2B illustrates the write operation in the light user mode. The total amount of the write data is the same in each mode.

As shown in FIG. 2A, in the heavy user mode, each of the parallel operation elements 1*a* to 1*d* performs the write processing of data that is ¼ of the total amount of data at the same time over a time T. In this case, the power consumption for four parallel operation elements is consumed during the period of the time T. On the other hand, as shown in FIG. 2B, in the light user mode, first, each of the parallel operation elements 1*a* and 1*b* performs the write processing of data that is ¼ of the total amount of data at the same time over the time T. When the write processing by the parallel operation elements 1*a* and 1*b* is finished, each of the parallel operation elements 1*c* and 1*d* performs the write processing of data that is ¼ of the total amount of data at the same time over the time T. During the writing, the power consumption for two parallel operation elements is consumed. In this manner, in the light user mode, writing is performed in twice the time and with half the power consumption of the heavy user mode.

Figure 3:
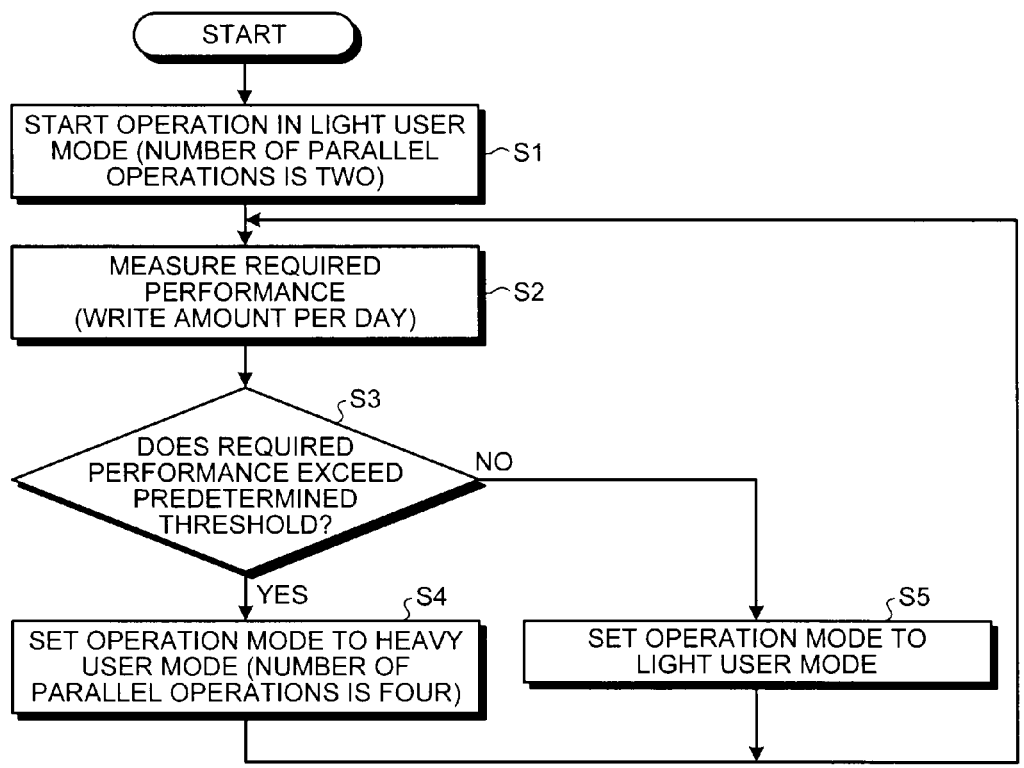
FIG. 3 is a flowchart explaining an operation of changing a mode by the SSD in the first embodiment.

FIG. 3 is a flowchart explaining an operation of changing the mode by the SSD 100 in the first embodiment. The operation of changing the mode at the time of writing and the operation of changing the mode at the time of reading are the same, so that the operation of changing the mode at the time of writing is explained as a representative in this example.

As shown in FIG. 3, first, the SSD 100 starts the operation in the light user mode (Step S1). The required-performance measuring unit 6 measures the write amount per day (Step S2). The MPU 42 compares the measured write amount per day with a predetermined threshold and determines whether the write amount exceeds the predetermined threshold (Step S3). When the write amount per day exceeds the predetermined threshold (Yes at Step S3), the MPU 42 sets the operation mode to the heavy user mode (Step S4). When the write amount per day does not exceed the predetermined threshold (No at Step S3), the MPU 42 sets the operation mode to the light user mode (Step S5). After Step S4 and Step S5, the system control proceeds to Step S2.

The operation mode at the time of reading is also changed by the same procedure as the operation-mode changing operation at the time of writing shown in FIG. 3.

In the above explanation, the number of the parallel operations at the time of writing and the number of the parallel operations at the time of reading are changed individually; however, it is applicable that the number of the parallel operations at the time of writing and the number of the parallel operations at the time of reading are set to the same value and are changed simultaneously. In this case, as the required performance used in the comparison at Step S3, any one or both of the write amount per day and the read amount per day can be used.

Moreover, the unit time measured as the required performance is not limited to one day. For example, the unit time can be one week. Furthermore, as the required performance, it is possible to employ a value other than a data amount of writing/reading per unit time. For example, it is possible to employ a duty ratio of the write processing, a duty ratio of the read processing, and the like.

Furthermore, it is explained that the operation mode is changed between the heavy user mode and the light user mode; however, three or more operation modes different in the number of the parallel operations can be set. In the case of setting three or more operation modes, two or more values are set as the thresholds used at Step S3 so that classification can be performed for the number of the operation modes.

Moreover, it is explained that in the light user mode, data that is ¼ of the total amount of data is written in each of the parallel operation elements 1a and 1b, and thereafter data that is ¼ of the total amount of data is written in each of the parallel operation elements 1c and 1d; however, it is applicable that the parallel operation elements 1c and 1d are controlled not to operate and data that is ½ of the total amount of data is written in each of the parallel operation elements 1a and 1b. Thereafter, next write data can be written in each of the parallel operation elements 1c and 1d, or the next write data can be written in the parallel operation elements 1a and 1b continuously and, when there is no writable area remained in the parallel operation elements 1a and 1b, writing to the parallel operation elements 1c and 1d can be started.

Furthermore, it is explained that the mode is set to the light user mode at the time of starting the operation; however, the operation can be started in the heavy user mode.

Moreover, the operation at Step S2 can be started at a later time after Step S4 and Step S5 without performing the step of measuring the required performance at Step S2 immediately after Step S4 and Step S5.

Furthermore, the control unit 4 is configured to include the NAND controllers 41a to 41d the number of which is equal to the number of the parallel operation elements 1a to 1d; however, the configuration can be such that the parallel operation elements 1a to 1d can be operated in parallel by the NAND controllers the number of which (for example, one) is smaller than the number of the parallel operation elements 1a to 1d.

As above, according to the first embodiment of the present invention, the configuration is such that the required performance from the host device 200 is measured and the number of simultaneous executions of reading/writing of the parallel operation elements 1a to 1d included in the NAND memory 1 is changed based on the measured required performance, so that the power consumption can be changed in accordance with the required performance from the host device 200.

In the technology in Japanese Patent Application Laid-open No. 2009-251888, the memory system changes the current consumption based on the command from the host device; however, in the first embodiment of the present invention, the SSD 100 changes the power consumption based on the measured required performance, thereby having an advantage in that issuance of a command specifying the power consumption (or speed of the read/write processing) by the host device 200 is not needed.

Figure 4:
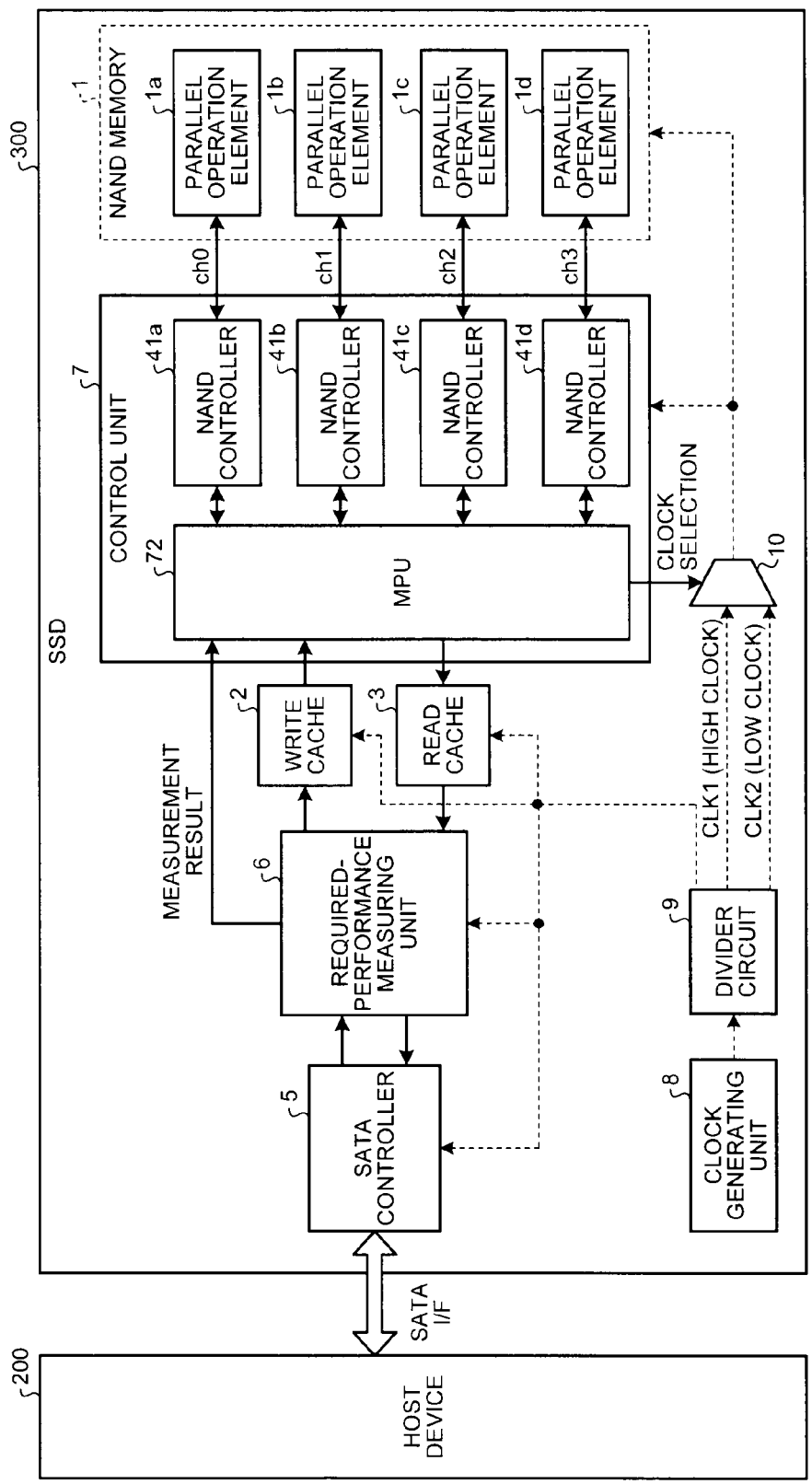
FIG. 4 is a block diagram illustrating a configuration of an SSD in a second embodiment.

In a second embodiment, an operation clock can be changed in accordance with the operation mode. FIG. 4 is a block diagram illustrating a configuration of an SSD in the second embodiment. In this example, components that are the same as those in the first embodiment are given the same reference numerals and detailed explanation thereof is omitted.

As shown in FIG. 4, an SSD 300 in the second embodiment includes the NAND memory 1, the write cache 2, the read cache 3, the SATA controller 5, the required-performance measuring unit 6, a control unit 7, a clock generating unit 8, a divider circuit 9, and a selection circuit 10. The NAND memory 1 includes four parallel operation elements 1a to 1d in the similar manner to the first embodiment. The control unit 7 includes the NAND controllers 41a to 41d connected to the parallel operation elements 1a to 1d by control lines, respectively, and an MPU 72.

The clock generating unit 8 generates a clock for operating the SSD 300. The divider circuit 9 generates a clock to be supplied to each component by dividing a clock generated by the clock generating unit 8. The divider circuit 9 generates a plurality of types of clocks (in this example, CLK1 and CLK2) with different clock frequencies as clocks to be supplied to the control unit 7 and the NAND memory 1. The CLK1 is a clock higher (i.e., clock frequency is higher) than the CLK2. The CLK1 and the CLK2 are input to the selection circuit 10, and the selection circuit 10 selects one of the CLK1 and the CLK2 based on a clock selection signal input from the MPU 72 and outputs it. The clock output from the selection circuit 10 drives the control unit 7 and the NAND memory 1.

In FIG. 4, a clock different from the CLK1 and the CLK2 is input in common from the divider circuit 9 to other components (the write cache 2, the read cache 3, the SATA controller 5, and the required-performance measuring unit 6) other than the control unit 7 and the NAND memory 1; however, it is applicable that different clocks are input thereto.

The MPU 72 changes the clock for driving the control unit 7 and the NAND memory 1 by operating the clock selection signal based on the measurement result by the required-performance measuring unit 6. As the control unit 7 and the NAND memory 1 are driven at a higher clock, the read/write processing is performed at higher speed and the power consumption thereof increases. Therefore, in this case, in the operation at the CLK2, the speed of the read/write processing becomes slower than the operation at the CLK1; however, the power consumption can be suppressed. The mode operating at the CLK1 is defined as the heavy user mode and the mode operating at the CLK2 is defined as the light user mode.

Figure 5:
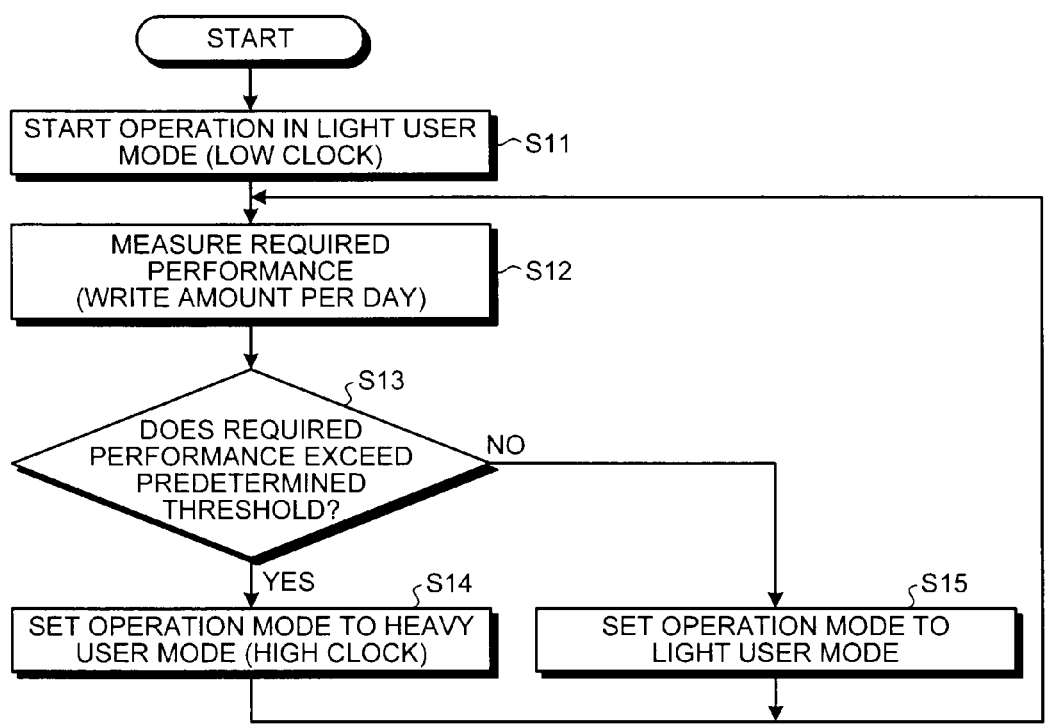
FIG. 5 is a flowchart explaining an operation of changing a mode by the SSD in the second embodiment.

FIG. 5 is a flowchart explaining an operation of changing the mode by the SSD 300 in the second embodiment. The operation of changing the mode at the time of writing and the operation of changing the mode at the time of reading are the same, so that the operation of changing the mode at the time of writing is explained as a representative in this example.

As shown in FIG. 5, first, the SSD 300 starts the operation in the light user mode (Step S11). The required-performance measuring unit 6 measures the write amount per day (Step S12). The MPU 72 compares the measured write amount per day with a predetermined threshold and determines whether the write amount exceeds the predetermined threshold (Step S13). When the write amount per day exceeds the predetermined threshold (Yes at Step S13), the MPU 72 sets the operation mode to the heavy user mode (Step S14). When the write amount per day does not exceed the predetermined threshold (No at Step S13), the MPU 72 sets the operation mode to the light user mode (Step S15). After Step S14 and Step S15, the system control proceeds to Step S12.

The operation mode at the time of reading is also changed by the same procedure as the operation-mode changing operation at the time of writing shown in FIG. 5.

As described above, according to the second embodiment of the present invention, the configuration is such that a plurality of types of clocks with different frequencies is generated and one of the generated clocks is selected based on the measured required performance, so that the power consumption can be changed in accordance with the required performance from the host device 200 without requiring a command from the host device 200.

In a memory cell in a DRAM, one capacitor is connected to one transistor and data is stored by accumulating charges in the capacitor. The charges decrease over time, so that if charges are not refreshed periodically, charges are lost and thus a data error occurs. In other words, when data is stored in the DRAM, the refresh needs to be performed periodically, so that the power for the refresh is continuously consumed during the period in which the data is stored.

On the other hand, there is a DRAM that has a partial refresh function of partially refreshing a memory cell array instead of refreshing the whole DRAM (for example, see Japanese Patent Application Laid-open No. 2004-234713). Specifically, for example, in the memory cell array that has four banks of bank 0 to bank 3, in a full refresh in which the whole chip is refreshed, the four banks are simultaneously refreshed. On the other hand, in the partial refresh, the number of the banks to be refreshed is, for example, set to ½. In other words, first, for example, only the bank 0 and the bank 1 are refreshed and the bank 2 and the bank 3 are set to the off-state. With such operation, the current consumption can be reduced in accordance with a capacity of an area in which valid data is stored.

In a third embodiment of the present invention, the write cache and the read cache are composed of the DRAM that has the partial refresh function. The capacity of the write cache and the read cache is adaptively changed in accordance with the required performance and the area that is not used as the write cache and the read cache is set to the off-state.

Figure 6:
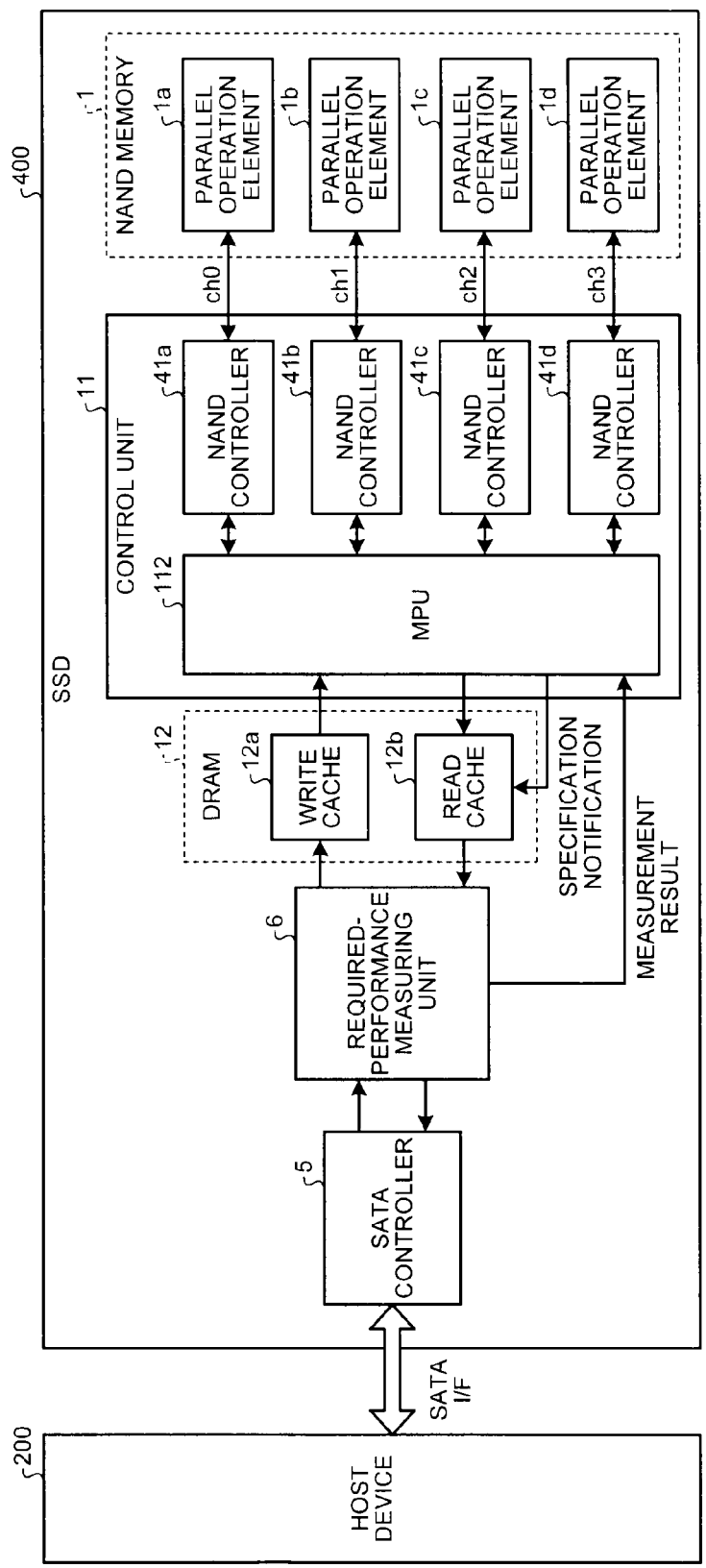
FIG. 6 is a block diagram illustrating a configuration of an SSD in a third embodiment.

FIG. 6 is a diagram illustrating a configuration of an SSD in the third embodiment of the present invention. Components that are the same as those in the first embodiment are given the same reference numerals and detailed explanation thereof is omitted.

As shown in FIG. 6, an SSD 400 in the third embodiment includes the NAND memory 1, the SATA controller 5, the required-performance measuring unit 6, a control unit 11, and a DRAM 12 including a write cache 12a and a read cache 12b. The NAND memory 1 includes four parallel operation elements 1a to 1d in the similar manner to the first embodiment. The control unit 11 includes the NAND controllers 41a to 41d connected to the parallel operation elements 1a to 1d by control lines, respectively, and an MPU 112.

The MPU 112 selects one operation mode based on the measurement result by the required-performance measuring unit 6 and notifies the DRAM 12 of a notification (specification notification) that specifies the selected operation mode. The DRAM 12 has the partial refresh function and can increase and decrease the area to be refreshed based on the specification notification from the MPU 112. In this example, the SSD 400 operates in two operation modes of the light user mode and the heavy user mode same as the first embodiment and the specification notification notifies the DRAM 12 of one of the light user mode and the heavy user mode. Moreover, when the heavy user mode is notified, the DRAM 12 sets the whole storage area of the DRAM 12 as a refresh target, and when the light user mode is notified, the DRAM 12 sets half of the storage area of the DRAM 12 as the refresh target.

Figure 7A:
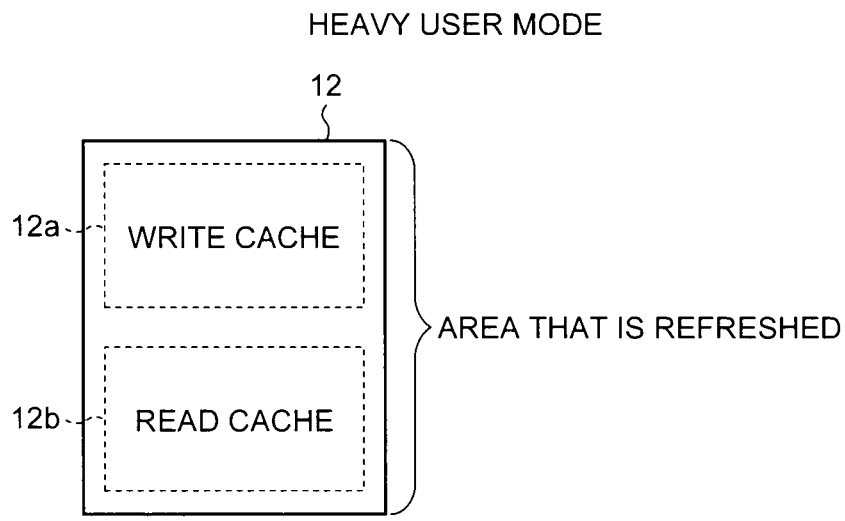
FIGS. 7A and 7B are diagrams explaining a configuration of a DRAM.
Figure 7B:
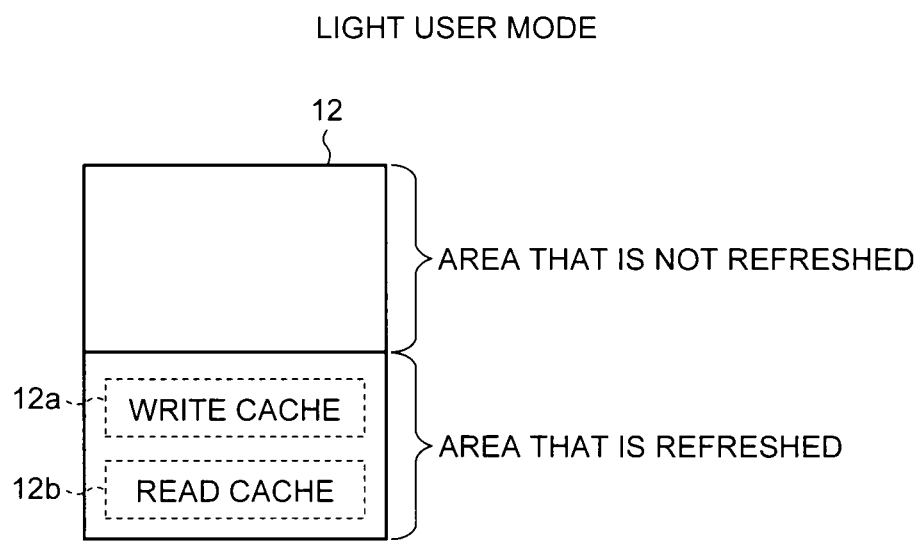

FIGS. 7A and 7B are diagrams explaining the configuration of the DRAM 12 when operating in the two operation modes. At the time of operating in the heavy user mode, as shown in FIG. 7A, the whole area of the DRAM 12 is the refresh target. As the storage area of the write cache 12a and the read cache 12b, an area that is ½ of the storage area of the DRAM 12 is secured for each of them. At the time of operating in the light user mode, as shown in FIG. 7B, only half of the area of the DRAM 12 is the refresh target. As the storage area of the write cache 12a and the read cache 12b, an area that is ½ of the storage area as the refresh target is secured for each of them. In other words, when operating in the light user mode, the capacity of the storage area of the write cache 12a and the read cache 12b is reduced to half compared with the case of operating in the heavy user mode.

Figure 8:
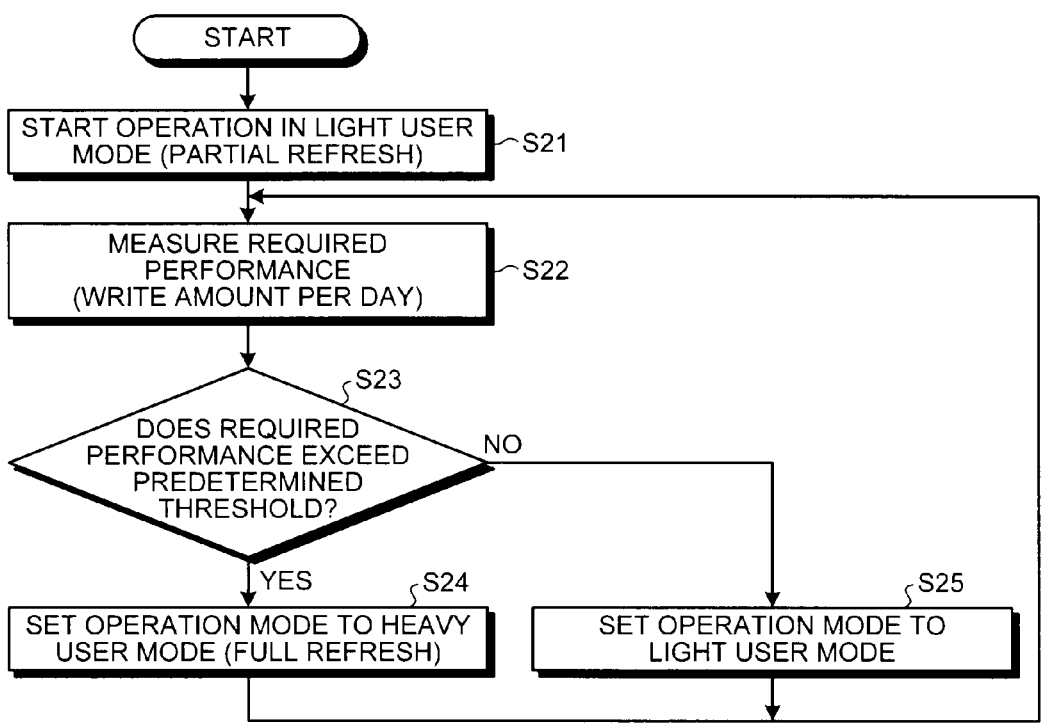
FIG. 8 is a flowchart explaining an operation of changing a mode by the SSD in the third embodiment.

FIG. 8 is a flowchart explaining an operation of changing the mode by the SSD 400 in the third embodiment. The operation of changing the mode at the time of writing and the operation of changing the mode at the time of reading are the same, so that the operation of changing the mode at the time of writing is explained as a representative in this example.

As shown in FIG. 8, first, the SSD 400 starts the operation in the light user mode (Step S21). The required-performance measuring unit 6 measures the write amount per day (Step S22). The MPU 112 compares the measured write amount per day with a predetermined threshold and determines whether the write amount exceeds the predetermined threshold (Step S23). When the write amount per day exceeds the predetermined threshold (Yes at Step S23), the MPU 112 sets the operation mode to the heavy user mode (Step S24). When the write amount per day does not exceed the predetermined threshold (No at Step S23), the MPU 112 sets the operation mode to the light user mode (Step S25). After Step S24 and Step S25, the system control proceeds to Step S22.

The operation mode at the time of reading is also changed by the same procedure as the operation-mode changing operation at the time of writing shown in FIG. 8.

An upper limit exists for the number of times of rewriting of the NAND memory 1. When a cache (the write cache 12a and the read cache 12b) is provided, the effect of extending the time (life) before the number of times of rewriting reaches the upper limit can be obtained. In other words, write data from the host device 200 is not immediately written in the NAND memory 1, and a predetermined amount of data is stored in the cache and the stored data is collectively written to the NAND memory 1, thereby enabling to reduce a write frequency to the NAND memory 1 and thus extend the life of the NAND memory 1.

The effect of extending the life of the NAND memory 1 per unit write amount from the host device 200 becomes large as the capacity of the cache is large. Therefore, in the present embodiment, when operating in the light user mode in which the storage capacity of the cache is small, the life per unit write amount becomes short compared with the case of operating in the heavy user mode; however, the SSD 400 operates in the light user mode when an amount of access per unit time is small, so that no big difference occur in the product life (service life) of the SSD 400 between the case of operating in the heavy user mode and the case of operating in the light user mode. In other words, when being operated in the light user mode, the power consumption can be reduced without causing the difference in the product life compared with the case of being operating in the heavy user mode.

In the above explanation, the configuration is such that the capacity of the refresh target area is switched between two operation modes; however, switching can be made between three or more operation modes. For example, it is applicable that the MPU 112 can select an operation mode from among three or more operation modes in accordance with the required performance by using two or more thresholds at Step S23, and a wider storage area is set as the refresh target for the operation mode for higher required performance in the respective operation modes.

As described above, according to the third embodiment of the present invention, the configuration is such that the area of the refresh operation target in the storage area included in the DRAM 12 is change by instructing the DRAM 12 based on the required performance, so that the power consumption can be changed in accordance with the required performance from the host device 200 without requiring a command from the host device 200.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a memory that includes a plurality of parallel operation elements, each of which stores write data from a host device and on each of which read/write is individually performed;
a control unit that performs the read/write to the parallel operation elements simultaneously; and
a required-performance measuring unit that measures a required performance from the host device by measuring the amount of write data received from the host device or the amount of read data transmitted to the host device for a predetermined period of time continuously,
wherein the control unit:
changes number of simultaneous executions of the read/write of the parallel operation elements based on the required performance measured by the required-performance measuring unit with receiving neither a control signal nor a command for changing the number;
maintains the number after changing until the required-performance measuring unit measures the required performance again;
controls the memory in a first mode when the amount of the write data exceeds a predetermined threshold, the first mode being a mode in which the number is set to a maximum value; and
controls the memory in a second mode when the amount of the write data does not exceed a predetermined threshold, the second mode being a mode in which the number is set to less than the maximum value.

2. The memory system according to claim 1, wherein the required performance is a write amount per unit time from the host device and/or a read amount per unit time by the host device.

3. The memory system according to claim 1, wherein the required performance is a duty ratio of write processing per unit time from the host device and/or a duty ratio of read processing per unit time by the host device.

4. The memory system according to claim 1, further comprising an interface controller which controls a data transfer between the host device and the memory system, wherein
the required-performance measuring unit is connected between the interface controller and the control unit.

5. The memory system according to claim 4, wherein the interface controller is a SATA interface controller.

6. The memory system according to claim 4, wherein the interface controller is a SAS interface controller.

7. The memory system according to claim 4, wherein the interface controller is a PCI Express interface controller.

8. A memory system comprising:
a nonvolatile memory that stores write data from a host device;
a control unit that performs read/write on the memory;
a required-performance measuring unit that measures a required performance from the host device by measuring the amount of write data received from the host device or the amount of read data transmitted to the host device for a predetermined period of time continuously;
a clock generating system that generates a plurality of types of clocks with different frequencies; and
a clock selecting unit that selects one of the clocks and supplies selected clock to the memory and the control unit, wherein
the control unit issues a selection signal that specifies one of the clocks based on the required performance measured by the required-performance measuring unit, and
the clock selecting unit selects a clock based on the selection signal issued by the control unit,
wherein the control unit:
issues the selection signal with receiving neither a control signal nor a command for issuing the selection signal;
maintains the selection signal until the required-performance measuring unit measures the required performance again;
issues a first selection signal when the amount of the write data exceeds a predetermined threshold; and
issues a second selection signal when the amount of the write data does not exceed a predetermined threshold, the second selection signal specifying lower clock than a clock specified by the first selection signal.

9. The memory system according to claim 8, wherein the required performance is a write amount per unit time from the host device and/or a read amount per unit time by the host device.

10. The memory system according to claim 8, wherein the required performance is a duty ratio of write processing per unit time from the host device and/or a duty ratio of read processing per unit time by the host device.

11. The memory system according to claim 8, further comprising an interface controller which controls a data transfer between the host device and the memory system, wherein
the required-performance measuring unit is connected between the interface controller and the control unit.

12. The memory system according to claim 11, wherein the interface controller is a SATA interface controller.

13. The memory system according to claim 11, wherein the interface controller is a SAS interface controller.

14. The memory system according to claim 11, wherein the interface controller is a PCI Express interface controller.

15. A memory system comprising:
a nonvolatile memory that stores write data from a host device;
a volatile memory that includes a memory area in which the write data is cached and performs a refresh operation of the memory area;
a control unit that controls a data transfer between the nonvolatile memory and the volatile memory; and
a required-performance measuring unit that measures a required performance from the host device by measuring the amount of write data received from the host device or the amount of read data transmitted to the host device for a predetermined period of time continuously,
wherein the control unit:
changes an area of a refresh operation target in the memory area by instructing the volatile memory based on the required performance measured by the required-performance measuring unit with receiving neither a control signal nor a command for changing the area of the refresh operation target;
maintains the area of the refresh operation target until the required-performance measuring unit measures the required performance again;

controls the volatile memory in a first mode when the amount of the write data exceeds a predetermined threshold; and controls the volatile memory in a second mode when the amount of the write data does not exceed a predetermined threshold, the second mode being a mode in which the area of the refresh operation target is narrower than the area of the refresh operation target in the first mode.

16. The memory system according to claim 15, wherein the required performance is a write amount per unit time from the host device and/or a read amount per unit time by the host device.

17. The memory system according to claim 15, wherein the required performance is a duty ratio of write processing per unit time from the host device and/or a duty ratio of read processing per unit time by the host device.

18. The memory system according to claim 15, further comprising an interface controller which controls a data transfer between the host device and the memory system, wherein the required-performance measuring unit is connected between the interface controller and the control unit.

19. The memory system according to claim 18, wherein the interface controller is a SATA interface controller.

20. The memory system according to claim 18, wherein the interface controller is a SAS interface controller.

21. The memory system according to claim 18, wherein the interface controller is a PCI Express interface controller.

* * * * *